US011935144B2

(12) United States Patent
Garrett et al.

(10) Patent No.: US 11,935,144 B2
(45) Date of Patent: *Mar. 19, 2024

(54) SYSTEM AND METHOD FOR A WIRELESS MOBILE DEVICE INTERFACE INTEGRATED WITH A RESTAURANT POINT OF SALE SYSTEM AND WITH A CLOUD-ACCESSIBLE DATA CENTER FOR QUERYING A DATABASE OF CUSTOMER INFORMATION

(71) Applicant: Tillster, Inc., Los Angeles, CA (US)

(72) Inventors: James M. Garrett, Suwanee, GA (US); Yevgeniy Medynskiy, Atlanta, GA (US)

(73) Assignee: Tillster, Inc., Los Angeles, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 17/025,506

(22) Filed: Sep. 18, 2020

(65) Prior Publication Data

US 2021/0241394 A1 Aug. 5, 2021

Related U.S. Application Data

(63) Continuation of application No. 14/604,577, filed on Jan. 23, 2015, now Pat. No. 10,783,595.
(Continued)

(51) Int. Cl.
*G06Q 50/12* (2012.01)
*G06Q 20/10* (2012.01)
(Continued)

(52) U.S. Cl.
CPC .......... *G06Q 50/12* (2013.01); *G06Q 20/102* (2013.01); *G06Q 20/202* (2013.01);
(Continued)

(58) Field of Classification Search
CPC .... G06Q 50/12; G06Q 20/102; G06Q 20/202; G06Q 20/3223; G06Q 20/3224; G06Q 20/3276; G06Q 30/06
See application file for complete search history.

(56) References Cited

U.S. PATENT DOCUMENTS 6,473,739 B1 * 10/2002 Showghi .......... G06Q 10/06312
705/5
8,498,900 B1 7/2013 Spirin et al.
(Continued)

OTHER PUBLICATIONS

Canadian Office Action received Application No. CA 2,937,380, dated Feb. 18, 2022.
(Continued)

*Primary Examiner* — Ramsey Refai
(74) *Attorney, Agent, or Firm* — Knobbe, Martens, Olson & Bear, LLP

(57) ABSTRACT

A system and method for managing requests for integrating a handheld customer interface with a point of sale (POS) system are disclosed. In one aspect, an integrated customer interface module is configured to communicate with a wireless mobile computing device of a customer and a POS system associated with a restaurant chain. The integrated customer interface module is configured to receive a request from the customer to check in to one of the chain's restaurants, automatically generate an order in the POS system, receive information regarding the customer from the remote database, and send at least a portion of the information regarding the customer to the POS system so as to be used as identification in the ordering and purchasing at the restaurant.

20 Claims, 8 Drawing Sheets

Related U.S. Application Data

(60) Provisional application No. 61/931,439, filed on Jan. 24, 2014.

(51) Int. Cl.
*G06Q 20/20* (2012.01)
*G06Q 20/32* (2012.01)
*G06Q 30/06* (2023.01)

(52) U.S. Cl.
CPC ..... *G06Q 20/3223* (2013.01); *G06Q 20/3224* (2013.01); *G06Q 20/3276* (2013.01); *G06Q 30/06* (2013.01)

(56) References Cited

U.S. PATENT DOCUMENTS

| | | | | |
|---|---|---|---|---|
| 8,660,965 | B1* | 2/2014 | Bickerstaff | G06Q 20/3224 705/14.57 |
| 8,718,684 | B2* | 5/2014 | Ellis | H04W 4/14 705/14.1 |
| 8,744,913 | B2* | 6/2014 | Nasrallah | G06Q 10/02 705/5 |
| 2002/0095342 | A1* | 7/2002 | Feldman | G06Q 50/12 705/16 |
| 2004/0158494 | A1 | 8/2004 | Suthar | |
| 2008/0147514 | A1 | 6/2008 | Shuster et al. | |
| 2009/0037286 | A1 | 2/2009 | Foster | |
| 2011/0258058 | A1 | 10/2011 | Carroll et al. | |
| 2012/0209730 | A1 | 8/2012 | Garrett | |
| 2013/0144660 | A1 | 6/2013 | Martin | |

OTHER PUBLICATIONS

International Search Report and Written Opinion received in connection with PCT/US2015/012755 dated May 7, 2015.
Extended European Search Report received in Application No. 15741007.7, dated Jan. 2, 2018.
Communication pursuant to Article 94(3) EPC received in Application No. 15741007.7, dated Apr. 10, 2019.
Mexican Office Action received in Application No. MX/a/2016/009596, dated Apr. 10, 2019.
Examination report received in counterpart Australian Application No. 2015209146, dated Sep. 10, 2019.
Office Action received in counterpart Mexican Application No. MX/a/2016/009596 dated Nov. 26, 2019.
Office Action received in counterpart Indian Application No. 201627028723 dated Oct. 29, 2020.
Summons for Oral Proceedings received in European Application No. 15 741 007.7 dated Aug. 14, 2020.
Notice of Allowance received in Australian Application No. 2015209146 dated Aug. 31, 2020.
Office Action received in Canadian Application No. 2,937,380 dated Apr. 21, 2021.
Extended European search report received in EP 21157628.5 dated Sep. 14, 2021.

* cited by examiner

SYSTEM AND METHOD FOR A WIRELESS MOBILE DEVICE INTERFACE INTEGRATED WITH A RESTAURANT POINT OF SALE SYSTEM AND WITH A CLOUD-ACCESSIBLE DATA CENTER FOR QUERYING A DATABASE OF CUSTOMER INFORMATION

CROSS-REFERENCE TO RELATED APPLICATION

This application is a continuation of U.S. patent application Ser. No. 14/604,577, filed Jan. 23, 2015, which claims the benefit of U.S. Provisional Patent Application No. 61/931,439, filed Jan. 24, 2014, each of which is incorporated by reference herein in its entirety.

BACKGROUND

Field of the Disclosure

Among other things, this disclosure describes systems and methods for initiating a customer order using a handheld device, processing the customer order, and closing the customer order using a system integrated with a point of sale (POS) system in a restaurant or a hospitality industry environment.

Description of the Related Technology

Ordering food, drinks, and other items through a mobile or handheld device may be achieved through a mobile application on a device such as a cellphone. Traditionally, such mobile applications are not integrated with the POS systems used by restaurants. Moreover, most such mobile applications are branded specifically for a particular restaurant or a restaurant chain. Customers may need to repeatedly enter profile and payment information for various applications and customers may need to download multiple applications on their mobile devices in order to use mobile functionalities offered by multiple restaurants. Merchants and/or restaurants may need to create merchant accounts with each provider of a mobile application. The loyalty programs of the merchants and/or restaurants also do not integrate with the various mobile applications and existing POS systems used by restaurants.

SUMMARY OF CERTAIN INVENTIVE ASPECTS

According to one aspect of the disclosure, a customer interface system comprises one or more physical computing devices having a hardware processor and a computer memory. The computer memory is configured to store one or more program modules for automatically managing check-in requests. A data center is configured to communicate with a POS system and a remote database, and to execute one or more queries to the remote database. An integrated customer interface module is stored in a computer memory, wherein the integrated customer interface module is configured to communicate with the data center and a computing device of a customer. The integrated customer interface module is configured to: receive a request from the customer to check in; automatically generate an instruction in the POS system; receive information regarding the customer from the remote database; and send at least part of the information regarding the customer to the POS system.

According to another aspect of the disclosure, a computer implemented method for interacting with a customer comprises performing, under control of an integrated customer interface module stored in a computer memory and configured to communicate with a computing device of a customer and a POS system, the actions of: receiving a request from the customer to check in; automatically generating an instruction in the POS system; receiving information regarding the customer from the remote database; and sending at least a portion of the information regarding the customer to the POS system.

According to another aspect of the disclosure, a customer interface system comprises means for performing, under control of an integrated customer interface module stored in a computer memory and configured to communicate with a computing device of a customer and a POS system, the actions of: receiving a request from the customer to check in; automatically generating an instruction in the POS system; receiving information regarding the customer from the remote database; and sending at least a portion of the information regarding the customer to the POS system.

According to another aspect of the disclosure, a customer interface system operable with a POS system associated with a chain of restaurants, the customer interface system comprises a wireless mobile computing device having a hardware processor and a computer memory. The computer memory is configured to store a mobile application configured to automatically manage check-in requests. A cloud-accessible data center is configured to communicate with the restaurant chain POS system and a database of customer information for a plurality of customers remote from the wireless mobile computing device, and configured to generate and communicate queries to the remote database. An integrated customer interface module stored in a memory of a computer, when executed, is configured to communicate data with the data center and the wireless mobile computing device. The integrated customer interface module is further configured to: receive a request from the wireless mobile computing device for a specific customer to check in; in response to the request, automatically create an open ticket for adding food items in the restaurant chain POS system; after a query to the remote database, receive information associated with the specific customer; send at least a portion of the specific customer information to the restaurant chain POS system; and add the specific customer information portion to the open ticket so that the open ticket is uniquely associated with the specific customer. In some embodiments, the integrated customer interface module is further configured to automatically detect a current location of the specific customer. In some embodiments, the integrated customer interface module is further configured to automatically calculate one or more payment options for the customer, and the payment options comprise one or more of debit card, credit card, cash, gift card, and loyalty program points. In some embodiments, the information associated with the specific customer comprises at least one of the customer's name, the customer's profile maintained by a merchant or a group of related merchants, picture, loyalty program ID, past dining history, food preferences, allergies, and a favorite entree. In some embodiments, the integrated customer interface module is further configured to send a notification to one restaurant in the restaurant chain that has been associated with the check in request from the wireless mobile device, and the notification comprises the request for the specific customer to check in and at least a portion of the customer information. In some embodiments, the integrated customer interface module is further configured to receive food order details from the specific customer and to present a bill to the specific customer. In some embodiments, the integrated customer interface module is further configured to receive payment instructions from the specific customer. In some embodiments, the payment instructions comprise at least one of payment card type, payment card information, tip, and loyalty program information. In some embodiments, the integrated customer interface module is further configured to automatically communicate with a card reader and to process a payment from the specific customer. In other embodiments, the integrated customer interface module is further configured to receive feedback from the specific customer regarding dining experience.

According to another aspect of the disclosure, a computer implemented method for interacting with a customer at a specific one of a chain of restaurants comprises performing via a processor, under control of an integrated customer interface module stored in a computer memory and configured to communicate with a wireless mobile computing device of a customer and a POS system of the restaurant chain, the actions of: via communication with the wireless mobile computing device, receiving a request from the customer to check in at a specific restaurant of the chain of restaurants, wherein the specific restaurant is determined by a location of the customer; upon receipt of the request, automatically creating an open ticket for adding food items in the POS system; upon querying a remote database, receiving customer information specific to the customer from the remote database; upon receiving the customer information, sending at least a portion of the customer information to the POS system; and adding the customer specific information portion to the open ticket. In some embodiments, the method further comprises performing the action of automatically detecting a current location of the customer. In some embodiments, the method further comprises performing the action of receiving a bill and automatically calculating one or more payment options, the payment options comprising one or more of debit card, credit card, cash, gift card, and loyalty program points. In some embodiments, the customer information comprises at least one of the customer's name, the customer's profile maintained by a merchant or a group of related merchants, picture, loyalty program ID, past dining history, food preferences, allergies, and a favorite entree. In some embodiments, the method further comprises performing the action of notifying a host at the specific restaurant where the customer has checked in and providing at least a portion of the customer information to the specific restaurant. In some embodiments, the method further comprises performing the action of receiving food order details from the customer and presenting a total amount due to the customer. In some embodiments, the method further comprises performing the action of receiving payment instructions from the customer. In some embodiments, the payment instructions comprise at least one of payment card type, payment card information, tip, and loyalty program information. In other embodiments, the method further comprises performing the action of receiving billing information from a card reader and processing a payment from the customer.

According to another aspect of the disclosure, a computer implemented method for interacting with a customer of a restaurant chain comprises performing, under control of an integrated customer interface module stored in a computer memory and configured to communicate with a wireless mobile device of a customer and a POS system associated with the restaurant chain, the actions of: receiving a request from the customer to check in; automatically generating an instruction in the POS system; receiving information regarding the customer from a remote database; and sending at least a portion of the information regarding the customer to the POS system.

According to another aspect of the disclosure, a computer interface system for interacting with a customer of a restaurant chain comprises means for performing, under control of an integrated customer interface module stored in a computer memory and configured to communicate with a wireless mobile device of a customer and a POS system associated with the restaurant chain, the actions of: receiving a request from the customer to check in; automatically generating an instruction in the POS system; receiving information regarding the customer from a remote database; and sending at least a portion of the information regarding the customer to the POS system. In some embodiments, the computer interface system further comprises means for performing the action of automatically detecting a current location of the customer. In some embodiments, the computer interface system further comprises means for performing the action of receiving a bill and automatically calculating one or more payment options, the payment options comprising one or more of debit card, credit card, cash, gift card, and loyalty program points. In some embodiments, the customer information comprises at least one of the customer's name, the customer's profile maintained by a merchant or a group of related merchants, picture, loyalty program ID, past dining history, food preferences, allergies, and a favorite entree. In some embodiments, the computer interface system further comprises means for performing the action of notifying a host at the specific restaurant where the customer has checked in and providing at least a portion of the customer information to the specific restaurant. In some embodiments, the computer interface system further comprises means for performing the action of receiving food order details from the customer and presenting a total amount due to the customer. In some embodiments, the computer interface system further comprises means for performing the action of receiving payment instructions from the customer. In some embodiments, the payment instructions comprise at least one of payment card type, payment card information, tip, and loyalty program information. In some embodiments, the computer interface system further comprises means for performing the action of receiving billing information from a card reader and processing a payment from the customer. In other embodiments, the computer interface system further comprises means for performing the action of receiving feedback from the customer regarding a dining experience.

According to another aspect of the disclosure, a non-transitory computer readable storage medium storing computer executable instructions that when executed by a processor perform operations comprising: performing, under control of an integrated customer interface module stored in a computer memory and configured to communicate with a wireless mobile device of a customer and a POS system associated with the restaurant chain, the actions of: receiving a request from the a customer to check in; automatically generating an instruction in the a point of sale (POS) system associated with a restaurant chain; receiving information regarding the customer from a remote database; and sending at least a portion of the information regarding the customer to the POS system.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. The features and components of the following figures are illustrated to emphasize the general principles of the present disclosure and are not necessarily drawn to scale. Corresponding features and components throughout the figures may be designated by matching reference characters for the sake of consistency and clarity. Although dimensions may be shown in some figures, such dimensions are exemplary only and are not intended to limit the disclosure.

DETAILED DESCRIPTION

Various embodiments of systems, methods, processes, and data structures will now be described with reference to the drawings. Variations to the systems, methods, processes, and data structures which represent other embodiments will also be described.

Disclosed in the current disclosure is an integrated handheld customer interface system, particularly used in restaurants and hospitality industries. The integrated handheld customer interface system may be used by a customer of a restaurant and/or other food or hospitality service provider as an application on a mobile or hand held device; however, other devices or computer systems may be used. A customer may download the integrated handheld customer interface system prior to arriving to a restaurant or may even download and install the mobile application (also called the "mobile application," the "handheld application," and so forth) at the restaurant from their device (e.g., mobile, tablet, and hand held devices, and so forth).

After downloading and installing the application, a customer may create a profile, which in some embodiments includes the customer's profile data and a payment instrument, such as credit card information or online payment system account, e.g., GOOGLE WALLET™. The integrated handheld customer interface system stores a customer's information in a data center, and the customer is then able to use that information to customize their experience at a restaurant or make a payment to the restaurant. Moreover, in some embodiments, the integrated handheld customer interface system can assist the customer in selecting the most cost effective instrument to pay with (e.g., a gift card, credit card, debit card, etc.).

Figure 1A:
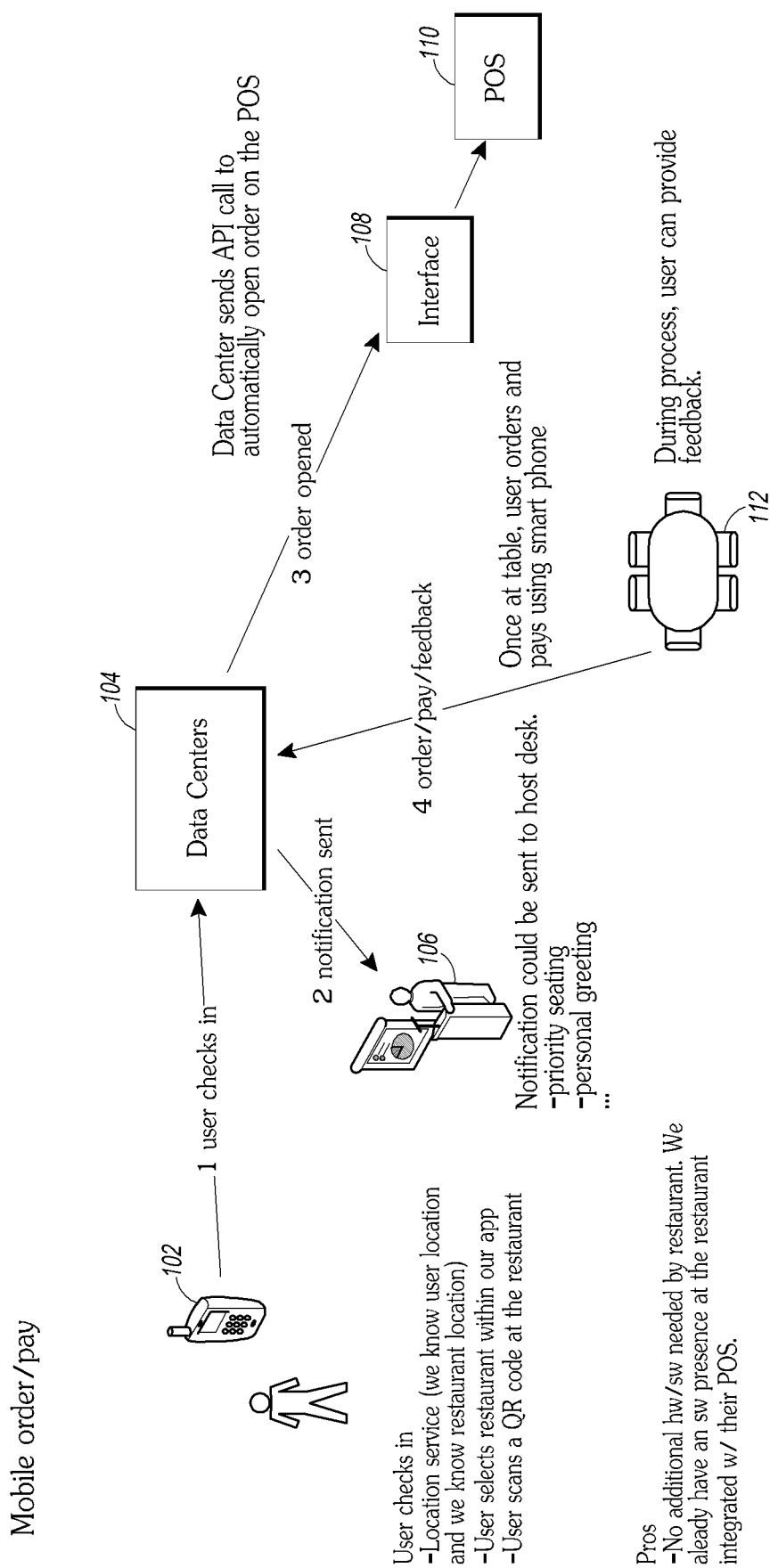
FIG. 1A is a diagram illustrating one embodiment of the integrated handheld customer interface system.

FIG. 1A illustrates one embodiment of the integrated handheld customer interface system. One of a plurality of customers (also called a user herein) first uses a mobile device 102 to start a mobile application provided as a part of the integrated handheld customer interface system. The mobile device 102 could be implemented as, for example, a smartphone, a tablet computer, a personal digital assistants (PDA), a mobile phone, an electronic book readers, or other wireless handheld device. If this is the first time the customer has ever used the mobile application, the customer may need to enter customer information that can be a profile and include customer specific data such as name, address, payment card information, loyalty program ID, food preferences, allergies, etc. In some embodiments, after the first few uses, the mobile application should have captured all or part of such information as to making repeated entries unnecessary.

After the customer starts the mobile application, the customer may check in to a restaurant. According to some embodiments, the mobile application may automatically provide one or more restaurants for the customer to check in or choose based on the customer's geographic location. The geographic location can be determined by the mobile computing device via GPS, for example. A set or user defined radius can be used to limit the identified and displayed restaurants. The list of restaurants can be limited to a specific branded chain of restaurants. The list can also be limited to restaurants serving a particular cuisine or other defining feature. In some embodiments, the mobile application may automatically rank the restaurants based on a history of dining. Other factors considered by the mobile application may include food preferences, allergies, whether the customer is a loyalty program member of the restaurant, and so forth. In some other embodiments, the customer may type in the name and/or location of a restaurant and check in to that restaurant. After receiving the customer's check-in request, the mobile application may send the check-in request to a data center. As used herein, a data center 104 can include a variety of computing devices and/or services, which may include physical computing nodes, storage devices, data stores, databases, remote program execution service based computing capacities, and so forth. Further, the data center 104 can implement one or more virtual machines, rather than dedicated servers. Likewise, the data stores, databases, or other data repositories can represent physical and/or logical data storage, including, for example, storage area networks or other distributed storage systems. Accordingly, the data center 104 can be Internet- or cloud-accessible.

In some embodiments, a check-in request by a customer may include not only information regarding the chosen restaurant, but also the customer's profile information and/or payment information. Depending on the embodiment, the customer's profile information may include name, photos, age, gender, food preferences, past dining histories with particular restaurants or restaurants in the same chain, loyalty ID number, food allergies, past reviews, and so forth. A customer's payment information may include, for example, debit card numbers, credit card numbers, past payment history, gift card or store credit card numbers, and so forth.

The data center 104 may process a customer's check-in request and forward a notification to the restaurant that is specified in the check-in request. The specific operations may be achieved automatically by the computing devices, which may use API calls or other methods of communication. The data center 104 may also directly, or indirectly through an interface 108, (also called the "Eat-to-go Interface" or the "EI") open an order at a POS system 110 of the chosen restaurant based on the customer's check-in request. In some embodiments, the notification sent to the host desk 106 may include information related to the customer, such as the customer's profile information and payment information. POS systems are a well known field of technology in which a computing environment of one or more computers is used to conduct transactions, and can be associated with all or a portion of a chain of retail stores such and restaurants, and so will not be elaborated on in detail in this document.

Depending on the embodiment, the notification sent to the host desk may also include dining histories at the chosen restaurant and/or dining histories and past order histories at other restaurants that belong to the same restaurant chain, brand, and/or corporate group. For example, if Yummy Restaurant is a chain restaurant with numerous locations, the customer's past dining histories at other locations of Yummy Restaurant may also be included in the check-in request and/or the notification sent to the restaurant or at the host desk. This will provide information to the host so that the host may find out about the customer's preferences even before the customer arrives. Moreover, in some other embodiments, the notification may be sent to a POS system 110 in a restaurant instead of a host desk 106. The notification may also be sent to a web interface or a user interface provided to the staff or the restaurant via a physical computing device in a restaurant or a tablet, mobile, or handheld device that may be accessed by the restaurant staff. Accordingly, the restaurant staff will be able to receive the notification and view information related to a customer.

In some embodiments, the notification sent to the host may also include loyalty program ID number and associated information, and also other metadata associated with the customer. With such information available, a host or hostess at the restaurant may be able to greet the customer by his preferred greeting, such as "Hello Mr. Smith." The host or hostess may easily find out that the customer is a VIP and likes to be seated inside near a particular area. The host or hostess may easily share this information with the wait staff, who may efficiently suggest the customer's favorite menu items to the customer. Depending on the embodiment, such information about a customer may be stored in the mobile application, on a remote database server as part of the data center, or both. The restaurant may also order priority seating to the customer based on the customer's information in the received notification.

After the customer arrives at the restaurant, members of the wait staff or the customer may link the order that is opened at the POS system 110 to the table 112 where the customer is seated. In some embodiments, the notification sent to the restaurant may include a picture of the customer, and a member of the wait staff may identify the customer using the picture. In some other embodiments, the customer may give a code which is generated by the mobile application or assigned by the data center 104 and sent to the mobile application to a waiter. The waiter may then use such information to link the order that is opened at the POS system 110 to the particular table where the customer is seated.

Depending on the embodiment, there may be a tableside QR code that the customer may scan in his or her application, which uniquely identifies a table in the restaurant. This would also allow the order that is opened at the POS system 110 to the table where the customer is seated. In some other embodiments, indoor geo-fencing or GPS systems may also accurately track the location of the customer inside the restaurant, and use such information to link the order in the POS system 110 to the table 112. The customer may also, depending on the embodiment, let the wait staff know about his identity, and the wait staff may then link the order in the POS system 110 to the customer and/or the table where the customer is seated.

The customer may either order directly on the mobile application before or after arriving at the restaurant or just order directly with members of the wait staff at the restaurant. Even if a member of the wait staff takes orders at the customer's table and adds menu items to the POS system 110 after receiving the customer's order, the customer may still add, remove, and/or modify his or her order using the mobile application. The mobile application may modify the existing order at the POS system 110 by communicating with the data center 104, which may send API calls or other automated instructions through physical computing devices to the POS system 110 at the restaurant.

The mobile application may also be used by the customer to pay for his or her meal. In some embodiments, the application may suggest the most cost-effective way to pay for his or her meal. Many online or off line retailers offer discounted dining gift cards. For example, Yummy Restaurant may sell gift cards at a discount. The mobile application may suggest gift card as an economic payment method, therefore, to a customer who has checked in to Yummy Restaurant and ordered food. Depending on the embodiment, the mobile application may help the customer order a gift card of suitable amount and add the gift card as a payment method.

In some embodiments, the mobile application may also suggest, to customers who are loyalty program members, that they may use points earned in the loyalty program to pay for part or all of the customer's check. The mobile application may also automatically choose a most cost-effective payment combination that may include one or more of debit/credit cards, cash, gift card, loyalty program points, and/or ongoing promotions at the restaurant.

Once the customer confirms the payment method and amount, the mobile application may finish the payment transaction for the customer so that the customer may leave the restaurant at any time without having to wait for a member of the wait staff. If that is the case, then the data center 104 may, through the interface 108, send a notification to the POS system 110 at the restaurant to close the order and mark it as paid, with sufficient details regarding payments. If, however, that the customer chooses to pay for the meal with a waiter or waitress, then upon payment at the POS system 110 in the restaurant, the interface 108, which communicates with the POS system 110, may notify the data center 104 that the order is paid. The data center 104 may notify the mobile application that the order has been paid.

In some embodiments, the mobile application may also allow the customer to submit feedback regarding the dining experience. The customer's feedback may be linked to the customer's dining loyalty ID number. The customer's feedback and/or ratings may be used to compare with previous feedbacks and provide the restaurant with information about how to improve the customer's dining experience.

Depending on the embodiment, the mobile application of the integrated handheld customer interface system may provide a "branded" user interface to the customer based on the particular restaurant and/or restaurant chain that the customer has checked into. For example, the mobile application may provide the same customer with a different user interface when the customer checks in to Yummy Restaurant than when the customer checks into Delicious Bistro. If the customer checks into Yummy Restaurant, his or her loyalty program ID and other specific information related to Yummy Restaurant may be shown. Moreover, the user interface may have an appearance that is "branded" with Yummy Restaurant's theme color, trademark, logo design, and so forth.

If the customer checks into Delicious Bistro, the mobile application will not suggest a gift card option for Yummy Restaurant. It will not use the customer's loyalty program information with Yummy Restaurant at Delicious Bistro. However, the mobile application may, in some embodiments, share part of the customer's profile information with another restaurant such as food allergies, favorite dishes, etc., upon permission. Additionally, if Delicious Café is co-owned or in the same chain as Delicious Bistro, then the customer's information or past dining information at Delicious Bistro may be shared to Delicious Café. The user interface presented to the customer when the customer checks into Delicious Café may also bear some resemblance to Delicious Bistro. The mobile application may suggest the customer to pay with either a Delicious Café or Delicious Bistro gift card if gift cards from one of them can be used at the other restaurant.

Figure 1B:
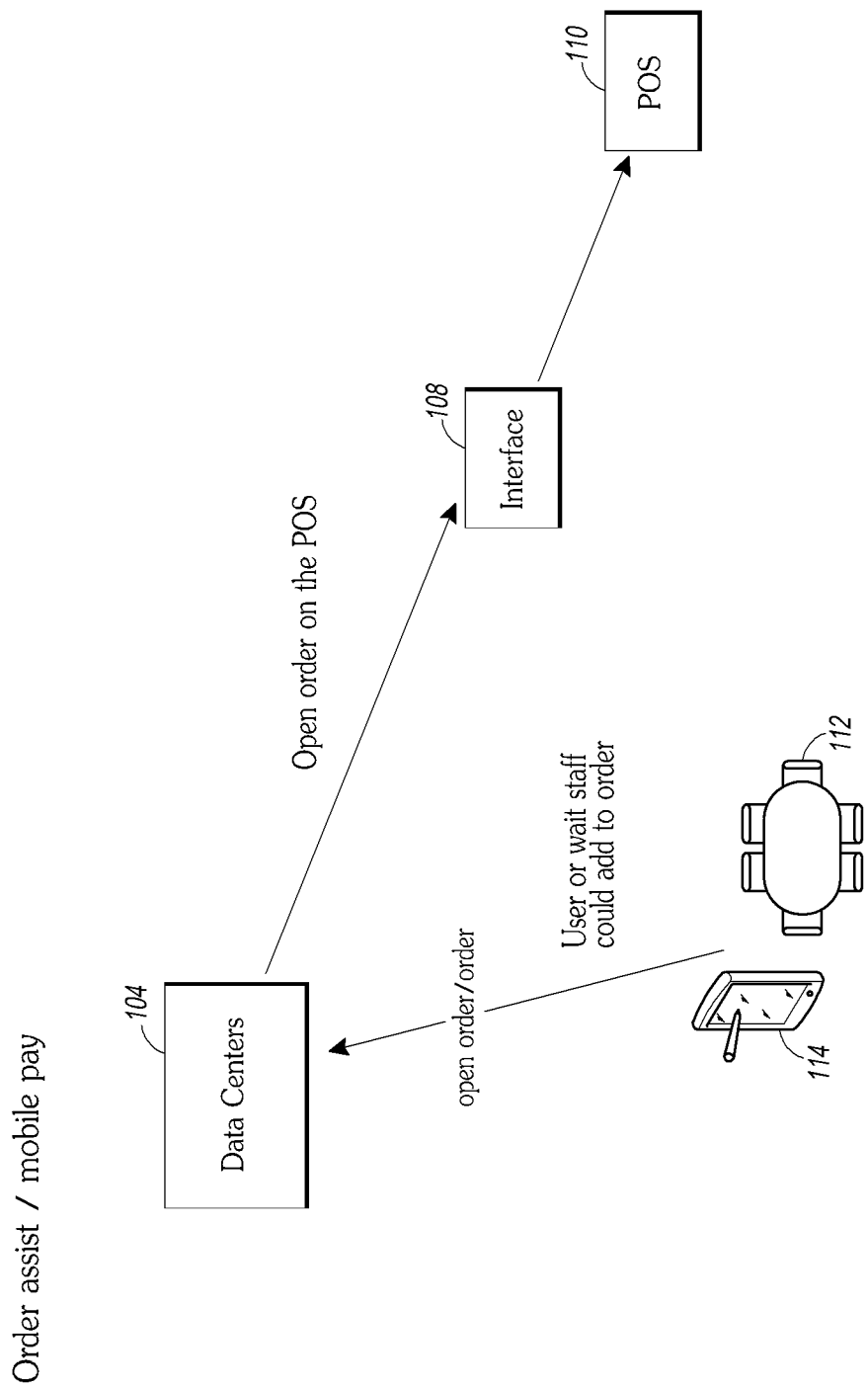
FIG. 1B is a diagram illustrating another embodiment of the integrated handheld customer interface system, in which a customer may use a mobile device at the restaurant table to pay or order food.

FIG. 1B presents another embodiment of the integrated handheld customer interface system. According to this embodiment, a mobile application may be installed in a tablet device 114 that is located at a table 112 in a restaurant. Although the word "tablet" is used, the mobile application may also be installed in a different computing device that is located at or near the tables in a restaurant, including but not limited to computers, mobile phones, laptops, and so forth. A customer who arrives at the restaurant, as in this example, does not need to have the mobile application installed in his or her mobile device. Instead, the customer may use the tablet 114 at the table 112. The customer may either log in or enter his or her information using the tablet device 114.

The data center 104 maintains a map and/or a database of tablets, IDs, and their locations in the various restaurants. Therefore, once a customer enters information, the data center 104 may receive the information and use such information to open an order. The opened order may be transferred either directly to a POS system 110 or indirectly to the POS system through an interface 108. Moreover, the customer may choose to either order food with the help of a waiter or waitress, or directly order food using the tablet device 114 at the table 112.

Depending on the embodiment, the customer has several choices for payment. In some embodiments, the customer may use the tablet device 114 and log into the mobile application, and pay using an existing or new payment account. In some other embodiments, the tablet may further connect to a card reader device and provide the customer with an option of paying directly with a credit card, debit card, and/or gift card.

Alternatively, the customer may also use a mobile application that is installed in his or her own mobile device 102 and make a payment for the meal using his or her own mobile device 102. The customer may find the order by typing in an order ID, which the customer may receive from the tablet at the table 112. The customer may also find and pay for the order by first scanning a QR code or ask the waiter for an order ID or code.

Figure 1C:
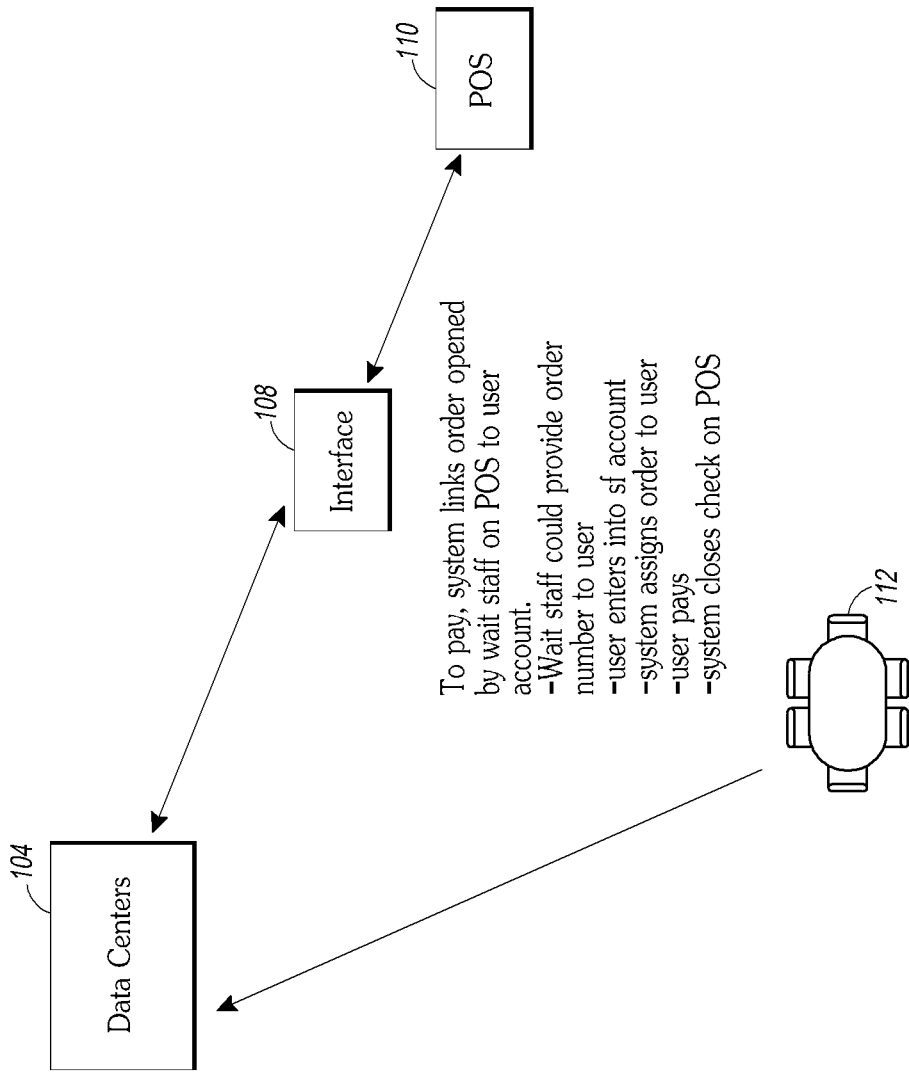
FIG. 1C is another diagram illustrating an embodiment of the integrated handheld customer interface system, focusing on the payment process.

FIG. 1C illustrates an embodiment of the integrated handheld customer interface system, focusing on the payment process in situations where an order has been opened by a member of the wait staff using the restaurant's POS system 110. As shown in FIG. 1C, a customer may need information from the POS system 110 in order to pay for his or her meal using the customer's own handheld device 102. Depending on the embodiment, the integrated handheld customer interface system may allow the POS system 110 to communicate with the data center 104 via the interface 108 or directly so that the POS system may send order ID numbers and/or other information to the data center 104. A member of the wait staff may provide the order number to the customer so that the customer may enter it using his or her own mobile device and pay for the meal. After the customer finishes payment using the mobile device, the POS system 110 may close the order (and/or check), and updates the data center 104 so that the data center 104 may update its database records.

Figure 2:
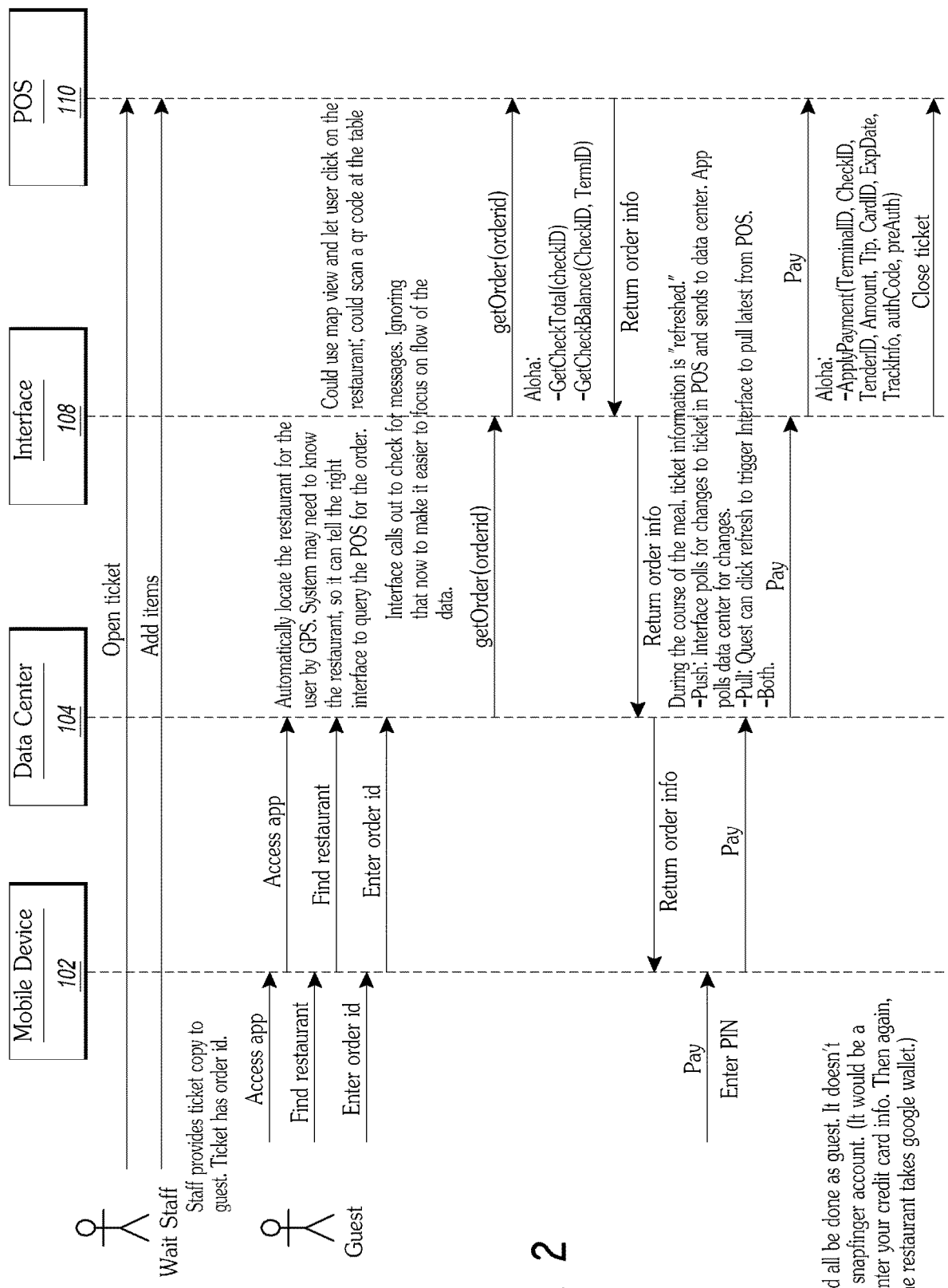
FIG. 2 is a timing diagram of an embodiment of the integrated handheld customer interface system, in which the wait staff at a restaurant, instead of the customer, may open a ticket in the restaurant's POS system.

FIG. 2 illustrates a timing diagram of another embodiment of the integrated handheld customer interface system, in which the wait staff at a restaurant, instead of the customer, may open a ticket in the restaurant's POS system 110 for a customer and begins adding items, as would normally occur at restaurants. At some point during the visit to the restaurant, after the ticket has been opened by someone at the restaurant, the customer accesses the mobile application on their mobile device 102 (e.g., mobile, tablet, and hand held device). The mobile device 102 may comprise a processing device and memory operatively connected to the respective processing device. Moreover, those skilled in the art should appreciate that mobile or hand held devices may be configured to transmit data, including global positioning system coordinates over a network such as a cellular data network, a Wi-Fi network, a LAN, a WAN, the internet, or any combination of these and/or any other networking technology known in the art. In the current embodiment, the user of the application may have already input information in their profile associated with the application, as previously described, or the user may create a profile and input their information while they are at the restaurant.

In the current embodiment, once the mobile application is accessed and profile information has been supplied by the customer, the appropriate restaurant may be identified. Different ways may be used in different embodiments to identify the restaurant where the ticket is open. For example, a global positioning system (GPS) may be used, the customer may select the restaurant by the use of a map and/or a search function, the customer may scan a Quick Response (QR) code at the restaurant, or other mechanisms may be used to identify the restaurant where the ticket is open.

An example of using GPS to identify the restaurant is provided in U.S. patent application Ser. No. 13/212,905, herein incorporated by reference. The patent application Ser. No. 13/212,905 discloses geo-fencing around a particular restaurant in order to determine when to release a particular customer's order. The geo-fencing may be set by a server, which may be configured to define an area, using GPS coordinates, within a certain distance around a particular restaurant that is "fenced." If a mobile or hand held device 102 using the mobile application is inside of the "fenced" area, determined by the continuous transmission of GPS data from the hand held or mobile device 102 representative of such device's location, the customer may be prompted by the use of a graphical customer interface (GUI) to select whether they are at a particular restaurant.

In the current embodiment, after the restaurant is identified, the open ticket may be associated with the customer's mobile application. In the current embodiment, this may be done with the use of an Order Identification (ID). The Order ID may be provided as a QR code at the table at which the customer is sitting, the wait staff may provide the Order ID to the customer after opening the ticket, or other methods may be used to associate the open ticket with the customer. If the wait staff provides an Order ID to the customer, the customer may input the Order ID into their mobile application on their hand held or mobile device 102 at any point before they are ready to process payment. Once the Order ID is input or in any other way supplied by the customer to their mobile application, the Order ID is then electronically passed to the data center 104.

At that point, in the current embodiment, since the integrated handheld customer interface system has been supplied with the Order ID and the particular restaurant, the data center 104 can communicate with the appropriate Application Programming Interface (API), hereinafter referenced as the interface 108 (also called the "Eat-to-go Interface" or the "EI"), enabling communication with the point of sale (POS) system 110 at the appropriate restaurant. The interface 108 is configured to communicate with the POS system 110 of a restaurant, and the interface 108 can send information to and receive information from the POS system 110.

In some embodiments, the interface 108 may include an Application Programming Interface (API) that enables the POS system 110 and data center 104 to interact with one another. Each interface 108 in the current embodiment may be separately addressable, and there may be one interface 108 per restaurant location. However, such a configuration is not required and other configurations may be provided, such as multiple restaurant locations associated with one interface.

In the current embodiment, a push model may be used where the data center may host a queue, and when a ticket is opened on the restaurant's POS system 110, the interface 108 may open a connection back to the data center 104 and keep the connection open in the event there is a message or request dropped in the data center 104 queue for the particular interface 108 associated with the restaurant. In the current embodiment, the connection may be reset every minute or two, but there is effectively an open connection between the data center 104 queue and the interface 108.

Once the customer provides the data center 104 with the Order ID or any other means of associating the customer with the open ticket, the data center 104 places a request in the data center queue for the appropriate interface 108. In the current embodiment, after the interface receives the request, for example by the use of the API getOrder(orderId), the interface 108 translates the request from the data center 104 to communicate with the appropriate POS system 110. In the current embodiment, once the POS system 110 receives the request to retrieve a particular order, it sends the identified open ticket information back to the interface 108. An example of the API from the interface 108 to the POS system 110 which commands the POS system 110 to retrieve the open ticket information is provided in the FIGS. 1 and 2. After the information is received by the interface 108, the interface 108 then translates the information back to the data center 104, which sends the information to the customer's mobile application on the mobile device 102.

Additionally, for the customer to obtain the open ticket information, a pull model may be used where the customer requests the order from their mobile application. Once this request is made, in the current embodiment, the request is sent to the data center 104, which then locates the appropriate interface, based on the particular restaurant, and after opening a connection with the interface 108, the request is sent from the data center 104 to the interface 108. The interface 108, in the current embodiment, then translates the request to communicate with the restaurant POS system 110. After the interface retrieves the open ticket information, the information is sent to the data center 104 and then to the customer.

Also, in the current embodiment, after the customer's mobile application has been associated with the open ticket, the integrated handheld customer interface system consistently refreshes the ticket information to accurately reflect real time additions and changes that are made to the open ticket in the restaurant. However, such a configuration is not required, and other methods may be used to update the open ticket information.

In some embodiments, different models may be used to refresh the ticket information. For example, a pull model may be used where the interface 108 continuously polls the restaurant POS system 110 for changes to the open ticket. Once there have been changes made in the restaurant POS system 110 and the interface 108 has recognized these changes, by polling the POS, the interface 108 then sends this information along to the data center 104.

In some embodiments, the data center 104 can then send the information directly to the customer's mobile application, or in other embodiments, the customer's mobile application can continuously poll the data center 104 for changes to the open ticket that the data center 104 receives from the interface 108. Such a configuration is not meant to be limiting, and other methods and configurations may be used to provide the customer's mobile application with real time additions and changes made to the open ticket in the POS system 110.

Another example of a way to provide the customer's mobile application with additions and changes made to the open ticket in the POS system 110 is a pull model. In the current embodiment, the pull model may be configured to allow the customer to request additions and changes made to the open ticket in the POS system. When the customer makes this request in their mobile application, by using a "refresh" button or some other means, the data center 104 will then trigger the interface 108 to pull the latest and most up to date open ticket from the POS system 110. Once the interface 108 has pulled the open ticket, the information is sent to the data center 104, and then back to the customer's mobile application.

The customer may choose to make a payment toward the open ticket in the restaurant POS system 110. As previously described, the customer may see the open ticket information from their mobile application, and in the current embodiment, the customer will have an option to pay for the open ticket on their mobile application. After the payment option is selected, in the current embodiment, the customer may enter a Personal Identification Number (PIN) in order to further the payment process. However, such a configuration is not required, and in some other embodiments, the customer does not have to enter a PIN.

In some embodiments, the integrated handheld customer interface system is configured to accept many different types of payment. For example, the requisite credit card or debit card information may be entered by the customer when they select to pay for their order, the data center 104 may have the information from one or more credit cards or debit cards saved (previously entered by the customer), the customer may wish to pay with Google Wallet™ or a gift card (which the integrated handheld customer interface system is configured to accept), or other methods of payment may be used.

Moreover, in some embodiments, the customer may have an option to select items or input how much they would like to contribute toward payment of the open ticket. Additionally, the customer may have an option to input a tip into the mobile application on the mobile device 102, which would be added to the open ticket payment.

Moreover, in some embodiments, the open ticket payment may be split in multiple ways. For example, if another mobile application customer wants to contribute to pay the open ticket, then the customer with the open ticket may add the second customer to the ticket (by entering a name or some other identification in mobile application). Additionally, in other embodiments, if another payer is not a mobile application customer, the customer with the application can input information for an invitation to be sent to the non-customer. For example, the customer may input the non-customer's email address into the mobile application running on the mobile device 102, and an invitation may then be sent to the non-customer. Such a configuration is not meant to be limiting and other configurations may be used, such as an SMS message or accessibility of a QR code to scan. In some embodiments, after the invitation is sent to the non-customer, the non-customer may be able to select to download the mobile application directly from the invitation and register as a customer.

In some embodiments, when the customer enters a payment, the payment information (the amount and the form of payment) is sent to the data center 104 (or if there is a payment option that has been saved for the customer, that information may be stored in the data center 104). In the current embodiment, the data center 104 will then send the information to the appropriate interface 108, which will then translate and pass the information along to the restaurant POS system 110, which will process the payment. Additionally, examples of APIs and modules used to process payment are provided herein. However, such a configuration for the command is not required, and other configurations may be used to command the POS system 110 to process the payment. In some embodiments, the POS system 110 will process the payment in the same way a payment would be processed in the restaurant. However, such a configuration as provided in FIGS. 1 and 2 for the API is not required, and other configurations may be provided to process the payment, such as processing the payment at a remote location from the restaurant.

In some embodiments, once the payment is processed by the POS system 110, the POS system 110 will send a message back to the interface 108 to notify it the payment has been processed (or there has been an error). The interface 108 will then send the message back to the data center 104, which will pass the notification message to the customer. In the current embodiment, if the customer selected to pay the full amount on the open ticket and the payment is successfully processed by the POS system 110, in addition to sending a message back to the interface 108, the POS system 110 will close out the open ticket. However, such a configuration is not required and other configurations may be used to close the open ticket.

If the customer does not select to pay the full amount on the open ticket or if there is an error, then the open ticket will remain open at the POS system 110. The wait staff, in the current embodiment, may then be able to see that the open ticket has been closed out or a payment has been processed toward the open ticket when they view the POS system 110. In an alternative embodiment, the wait staff may be provided with a hand held device that communicates with the POS system 110, and they may be able to see a payment has been made (or an error in payment has occurred) and/or that the open ticket has been closed out.

In alternative embodiments, an Order ID is not required to associate the customer with the open ticket. For example, since the restaurant location is known, all of the open tickets may be brought up to the customer, and the customer may select their open ticket from the list. Also, the data center 104 can narrow down the number of open tickets for the customer to select from based on different criteria (e.g., when they checked in, what they ordered, etc.). Moreover, to match the appropriate Order ID with the customer, an identifier can be affixed to the table in which the customer is sitting (e.g., a QR code the customer takes a picture of/scans with the application, a table number, or any other type of table identifier).

Further, an indoor GPS system may be used, which will provide the mobile application with a near precise location of a customer within the building. In the current embodiment, the precise location of the customer in the building can be coordinated with a particular table, and the table may be configured with a particular open ticket. By associating the location of the customer with a particular open ticket, the customer is not required to enter any information into the mobile application in order to be associated with a particular open ticket.

There are currently many types of indoor GPS systems on the market; for example, Enterprise Wi-Fi provides an indoor Wi-Fi based systems that can provide the location of something within any building (including height, showing which floor the customer is on). Moreover, in alternative embodiments, any other way may be used to associate the open ticket with the customer's mobile application, and a combination of different types of methods may also be used.

Figure 3:
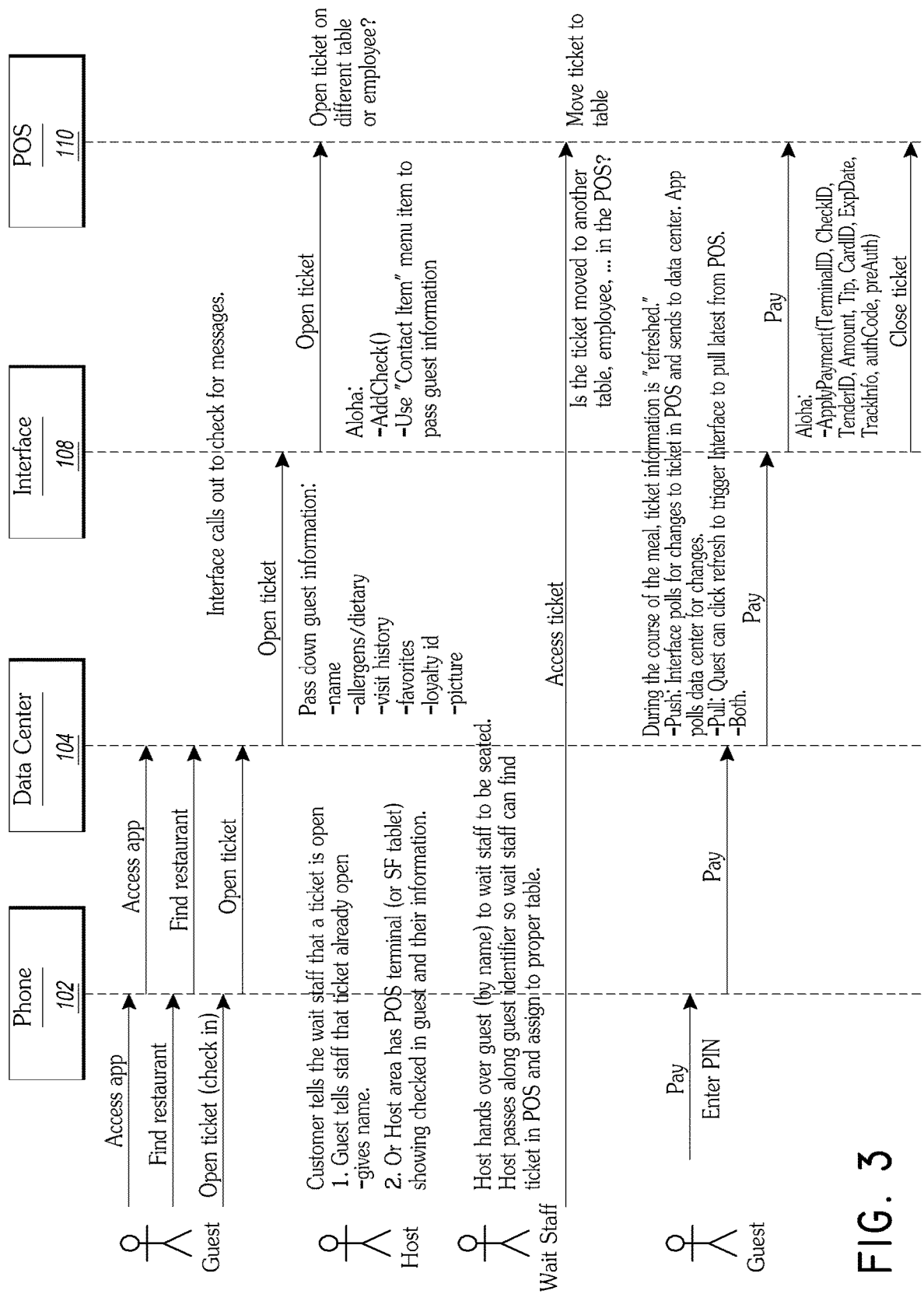
FIG. 3 is a timing diagram of another embodiment of the integrated handheld customer interface system.

FIG. 3 is a timing diagram of another embodiment of the integrated handheld customer interface system. In some embodiments, the customer may be enabled to open the ticket from the mobile application. The customer may first access the mobile application (mobile application), for example, on a hand held or mobile device. As previously described, the appropriate restaurant will need to be identified. Such identification may be made by GPS (possibly using geo-fencing), a QR code scanned at the restaurant, customer selection from a list and/or a map (possibly using GPS to do so), a restaurant identification code entered by the customer, or any other method that allows the appropriate restaurant to be identified. After the restaurant is identified, in the current embodiment, the customer may be prompted, via the GUI of the mobile application, to open a ticket. However, such a configuration is not required, and in other embodiments a ticket may be opened without first prompting the customer. In alternative embodiments, the customer may be able to open a ticket even if they are not at the restaurant.

In some embodiments, if the customer selects to open a ticket, a notification is sent to the data center 104, which then passes the information to the appropriate interface 108, and the interface 108 then translates and sends the information to the appropriate POS system 110. In some embodiments, along with notifying the interface to open a ticket, the data center 104 may also transmit information about the particular customer that has opened a ticket. The customer may have input particular information about themselves into the mobile application, such as their name, allergens, dietary preferences, favorite foods/drinks, loyalty identification, the customer's picture, or other information.

Additionally, the data center 104 may also have other information about the particular customer, such as visit history to the restaurant (what was ordered or how frequently they visit the restaurant), a picture can be obtained from an online search or social media (e.g., Twitter, Facebook, MySpace), or the data center 104 can have other types of information about the particular customer. Such information provided to the data center 104 and stored at the data center 104 is not meant to be limiting, and other types of information may also be provided by the customer or obtained and stored at the data center 104. Moreover, such information provided to the data center 104 or obtained and stored at the data center 104 may also be used with the embodiments described in FIG. 1.

After the notification to open a ticket and the particular customer information is transmitted to the interface 108 from the data center 104, the interface 108 then sends the notification and information along to the POS system 110. The particular customer information may be stored with the opened ticket in the POS system 110 (as long as the POS system 110 technically supports such information being entered into it). The request from the interface 108 to the POS system 110 to open a new ticket may be, for example Add_Check. In some embodiment, the new ticket may be opened in many different formats or configurations. The opened ticket may be added under a specific employee (name or identification), a table, the bar (if available), or to a general location where possibly other types of customer opened tickets are stored. Such a configuration is not meant to be limiting, and other ways of storing the ticket once it is initially opened may be used. After the ticket is opened, in the current embodiment, the customer may be able to reorder items that are already on the ticket (e.g., if the customer orders something at the bar while waiting for a table, the customer can then select to reorder what they previously ordered).

Additionally, in the current embodiment, the customer may be able to add items to their open ticket. The customer may be provided a list of items they can add to their open ticket via a GUI on the mobile application. In alternative embodiments, the list of items may range from just one or two items to a full menu provided to the customer. The list of items, in the current embodiment, may be stored at the data center 104 or may be retrieved from the POS system 110 (sent through the interface 108 and data center 104 back to the customer). In the current embodiment, if the mobile application customer does add items to their open ticket, the addition will appear in the POS system 110 (via the data center 104 and interface 108) as any other order input by the wait staff may appear.

Once the customer sits at a table or is assigned to a particular member of the wait staff, there are different ways to assign the customer's opened ticket to the particular member of the wait staff. For example, the customer can tell the member of the wait staff their name or an identification number (which can be included in the customer opened ticket) and the wait staff can move their ticket to their table, or the customer can enter a code affixed to the table or scan a code (e.g., a QR code) once they sit at the table. Such a configuration is not meant to be limiting and other configurations may be used to associate the customer with a particular member of the wait staff.

Depending on the embodiment, the data center 104 may be able to communicate directly or indirectly with computing devices (e.g., tablets, computers, or other hand held devices) at the restaurant, for example, devices at the host's station or hand held devices that members of the wait staff carry. Such communication enables the information provided to the data center 104 by the customer or obtained and stored at the data center 104 to be transmitted to these devices, and the host or wait staff may have greater access to particularized customer information. Moreover, some POS systems 110 may not support much of the additional information the data center 104 attempts to supply, but devices at the restaurant may be configured to support the data center 104 information (e.g., a picture of the customer).

For example, if the customer opens a ticket prior to entering the restaurant, a host at the restaurant may be notified, via the POS system 110, and/or a tablet or other device of the restaurant that communicates directly with the data center 104, that the customer has opened a ticket and has not yet arrived. The host can identify the person when they walk in (e.g., via a picture provided from the data center 104 to the device), and this will enable the restaurant to provide a personalized experience to the customer. Such personalized experiences can include: a personalized greeting when the customer enters the restaurant, preferred seating, a suggestion of food or drinks the data center information indicates the customer enjoys, and so forth. Such a configuration is not meant to be limiting and any other type of configuration where information is sent from the data center 104 directly or indirectly to devices at the restaurant may be used.

Such information from the data center 104, in some embodiments, may be transmitted once a ticket is open at the restaurant (by the customer or the wait staff), and the information may be transmitted in different ways to the devices. For example, the data center 104 information may be sent with other commands (e.g., opening the ticket) from the data center 104 to the interface 108 and then on to the POS system 110 (and then the POS system 110 communicate with the device(s) in the restaurant). Also, the data center 104 information may be sent to the interface 108 and on to the POS system 110, but at a different time than when other commands are sent.

Moreover, information stored at or access by the data center 104 may be transmitted directly to the devices in the restaurant without the use of the interface 108 or POS system 110. Additionally, in alternative embodiments, the devices and data center 104 may be configured in such a way that only certain devices receive information on particular customers (e.g., the wait staff that is servicing the customer) or all devices may receive information on each customer. Such a configuration is not meant to be limiting, and other configurations may be used to transmit any or all data center information to the devices.

Further, in alternative embodiments, the devices may be configured to provide information back to the data center 104 or to the customer via the data center 104 (e.g., a personalized message, wait time for a table). In some embodiments, the customer may provide an identification number (e.g., phone number) to the wait staff or host when they arrive to the restaurant, and the customer's profile may be accessed, which may show information provided by the customer or obtained and stored at the data center 104.

In some embodiments, loyalty reward programs may be used with the mobile application. In some embodiments, the mobile application may be configured to include its own loyalty reward program, communicate with other loyalty program applications, or communicate with a loyalty program the restaurant hosts. However, other configurations may be included, and such configurations are not meant to be limiting.

In some embodiments, if the mobile application communicates with other loyal program applications, the loyalty identification number associated with the other loyalty program may be passed off to the mobile application in different ways. For example, the loyalty identification number may be sent from the other loyalty program applications to the mobile application (once both applications are downloaded or some other mechanism to initiate the number to be sent), the customer may enter the loyalty identification number under their profile management in the mobile application, or the loyalty identification number may be scanned and stored in the mobile application. After an association of loyalty identification has been made with the customer's mobile application, such information may be stored in the data center 104 in some embodiments.

The customer's loyalty identification number may be included as part of the information that is sent to the interface 108 and on to the POS system 110 of the appropriate restaurant. However, other configurations may be used, for example, where the data center 104 sends the information directly to devices at the restaurant. In alternative embodiments, after the POS system 110 obtains the loyalty identification information, the POS system 110 may use its own system to process the loyalty identification or the POS system 110 may send the information to another system that processes the loyalty identification.

Figure 4:
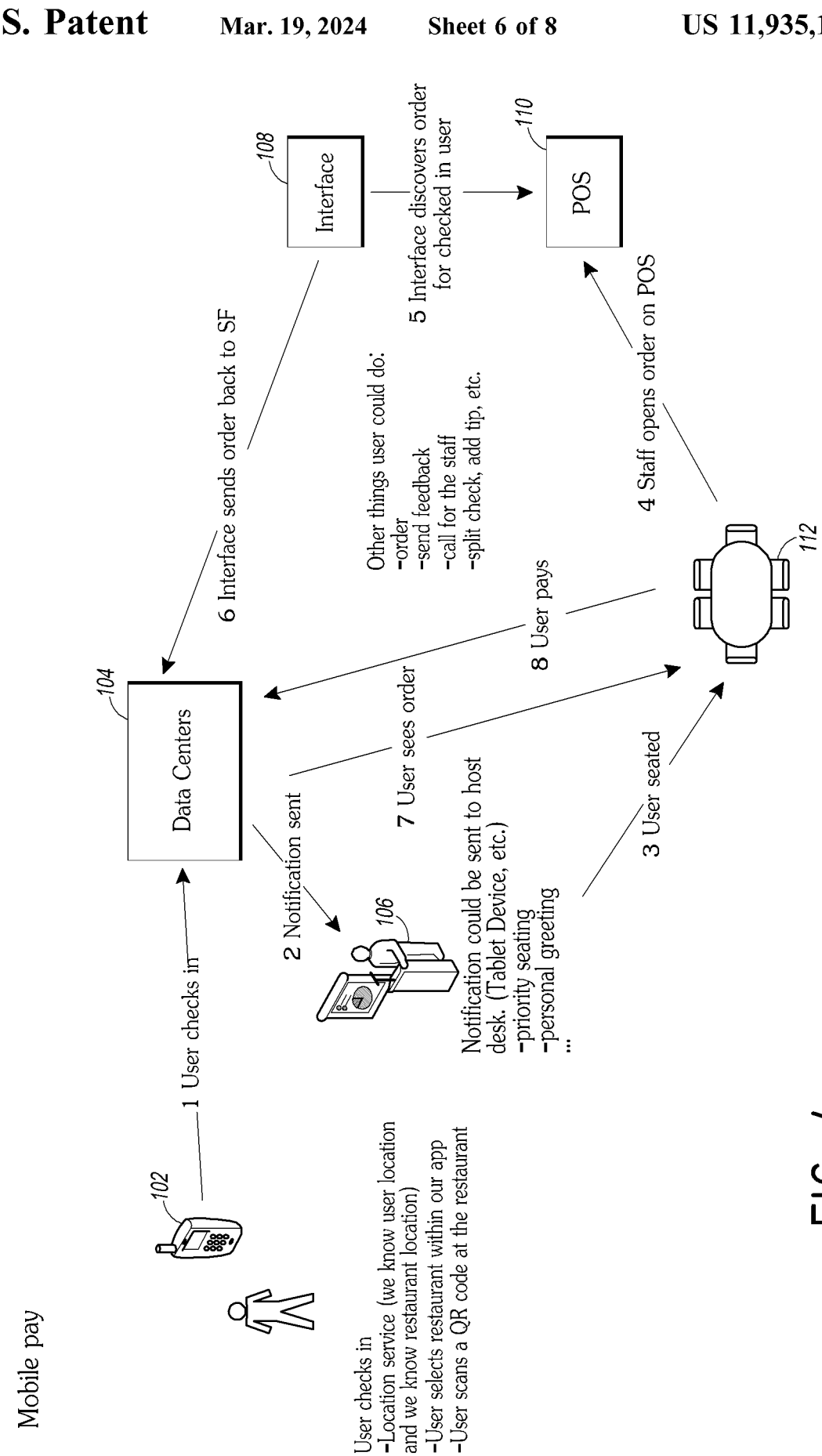
FIG. 4 is a diagram of the integrated handheld customer interface system.

FIG. 4 is a diagram of the integrated handheld customer interface system. A mobile application may allow a customer to order from a menu on the application, with or without the assistance of the wait staff. A customer can check in to a restaurant using the mobile application, which notifies the data center 104 of the check-in. The data center 104 notifies the restaurant by sending a notification to the host desk 106 or someone at the restaurant. After the customer is seated at the restaurant, a staff member at the restaurant may open an order at the POS system 110 in the restaurant.

The restaurant may find out that a customer has checked in by matching the customer's name, which may be included in the notification sent by the data center 104, to the name given by the customer. In some embodiments, the restaurant may present a customer interface to members of the wait staff so that they can see pictures, names, IDs, loyalty program IDs, etc., of a customer who has checked in, so that the restaurant staff may identify the customer as the customer comes into the restaurant. Alternatively, the customer may also ask the waiter for the order number at his or her table and enter that number to the mobile device accordingly.

Once the order is opened at the POS system 110, the order may also show up on the customer's mobile device 102. If there are multiple orders at the table, each mobile application customer may order separately, or in other embodiments, one customer may enter all of the orders for everyone at the table. In some embodiments, the open tickets may be combined at a table, and in other embodiments, the open ticket at the table may be split by several parties or separated by each seat at the table. Depending on the embodiment, customers may be able to add tips using their mobile applications. Still in other embodiments, the open ticket at the table may be split evenly between all of the mobile application customers at the table. Further, in some embodiments, all of the mobile application customers at the table may have access to the open ticket.

Figure 5:
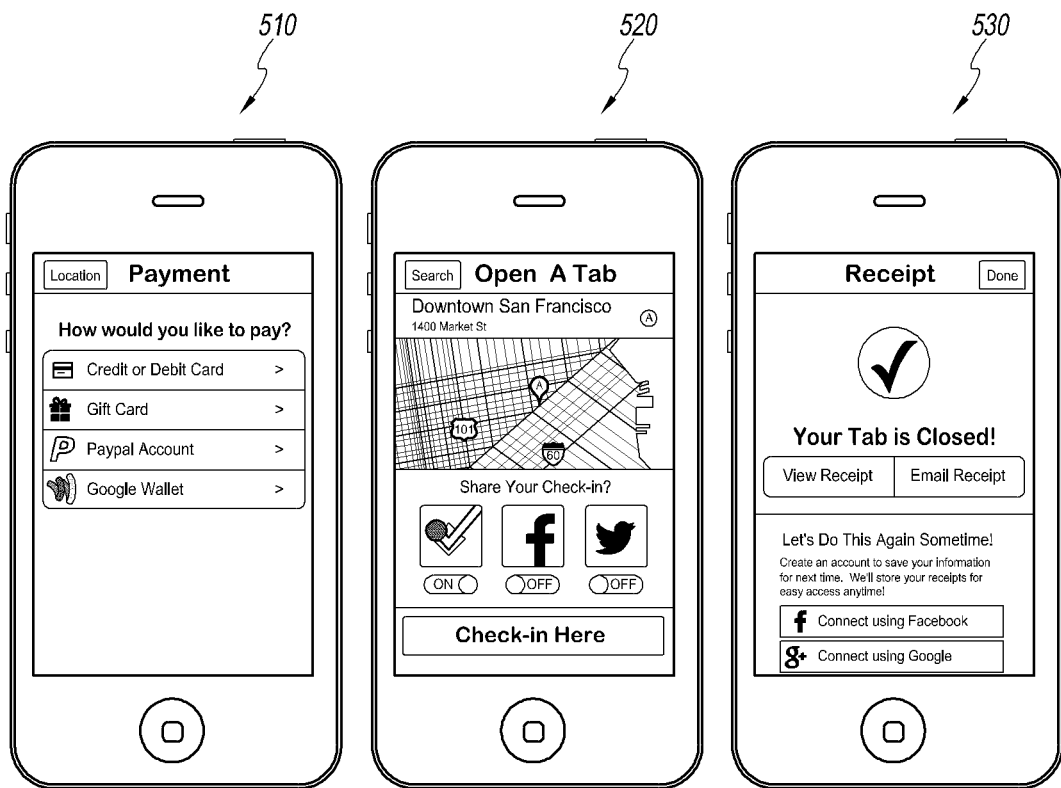
FIG. 5 is screen diagrams illustrating user interfaces of the integrated handheld customer interface system
Figure 5:
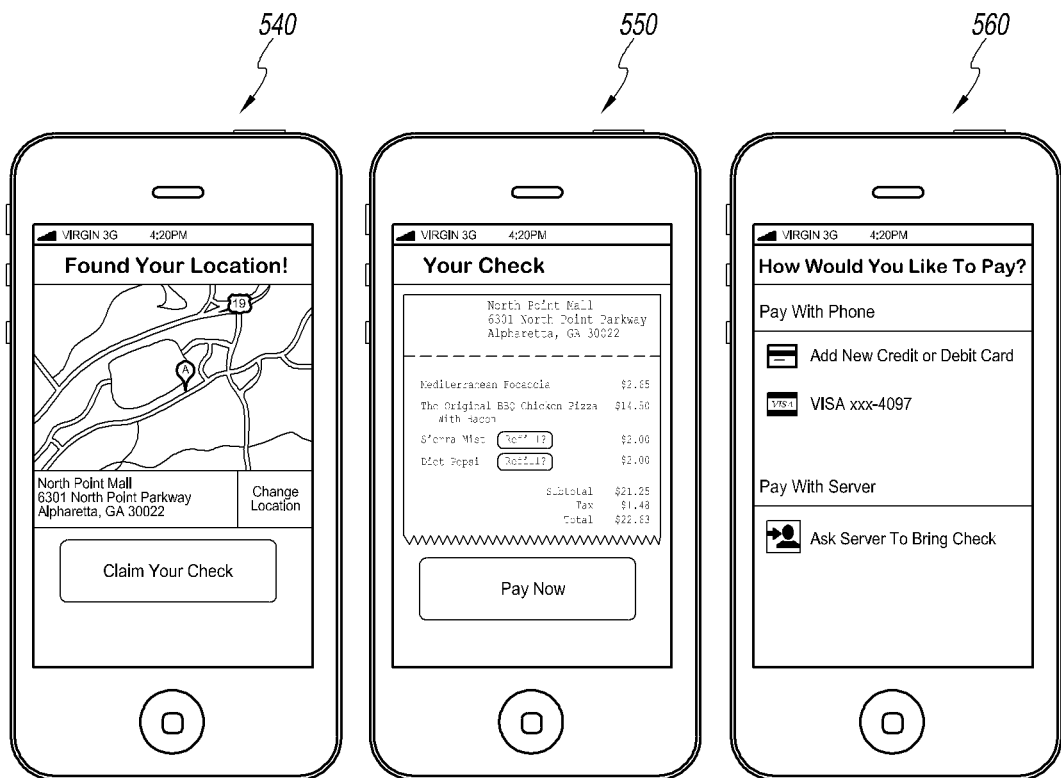

FIG. 5 provides screen diagrams illustrating user interfaces of the integrated handheld customer interface system. As previously stated, the mobile user interfaces may be "branded" to fit the styles, trademark, and/or logo of a particular restaurant and/or restaurant chain. User interface 510 asks how the customer would like to pay for a meal. It presents several options, including credit or debit card, gift card, Paypal™ account, and Google Wallet™ Other methods of payment may also be used. As previously stated, the mobile application may present the most cost-efficient way to pay to a customer, based on ongoing promotions, gift card discounts, loyalty program points, and so forth.

User interface 520 presents an example user interface that shows how a customer may check in to his or her social network accounts in the mobile application. This feature provides the customer an option to integrate his or her check-in at a restaurant with check-ins at other social network applications so that the customer does not have to check in repeatedly. This is especially valuable if checking into a restaurant via social networks may earn the customer additional loyalty points and/or discounts at a restaurant.

User interface 530 presents an example user interface that shows a customer that his or her tab has been closed. It offers the customer an option to view a receipt or send the receipt to an email address. It also offers the customer an option to log in with an existing social network account so that the customer does not have to enter payment information next time. This is because by logging in, an account for the mobile application may be created.

User interface 540 presents an example user interface that shows a customer that his or her location has been found by the mobile application at North Point Mall, which is located at 6301 North Point Parkway, Alpharetta, GA 30022. The data center 104, depending on the embodiment, may receive the customer's current location from the mobile application, and select the check or a list of checks that the data center 104 determines to be related to the customer based on at least the location. The user may choose to change location or claim his or her check (or choose the check from a list of checks).

User interface 550 presents an example user interface that shows the check of a customer. Depending on the embodiment, more or less detail may be included in such a user interface. The check may include information such as items ordered, price, and/or total amount due. Depending on the embodiment, the information presented may also include suggested tip amount, loyalty program ID number, and/or points, and so forth.

User interface 560 presents an example user interface that presents a question to the customer. The question is about how the customer would like to pay. In this example, the customer may choose to pay with his or her mobile phone. As shown in user interface 560, the customer may pay with an existing VISA card ending in 4097. The customer may also add a new credit or debit card. The customer may also pay with a server at the restaurant by pressing "Ask Server to Bring Check."

Figure 6:
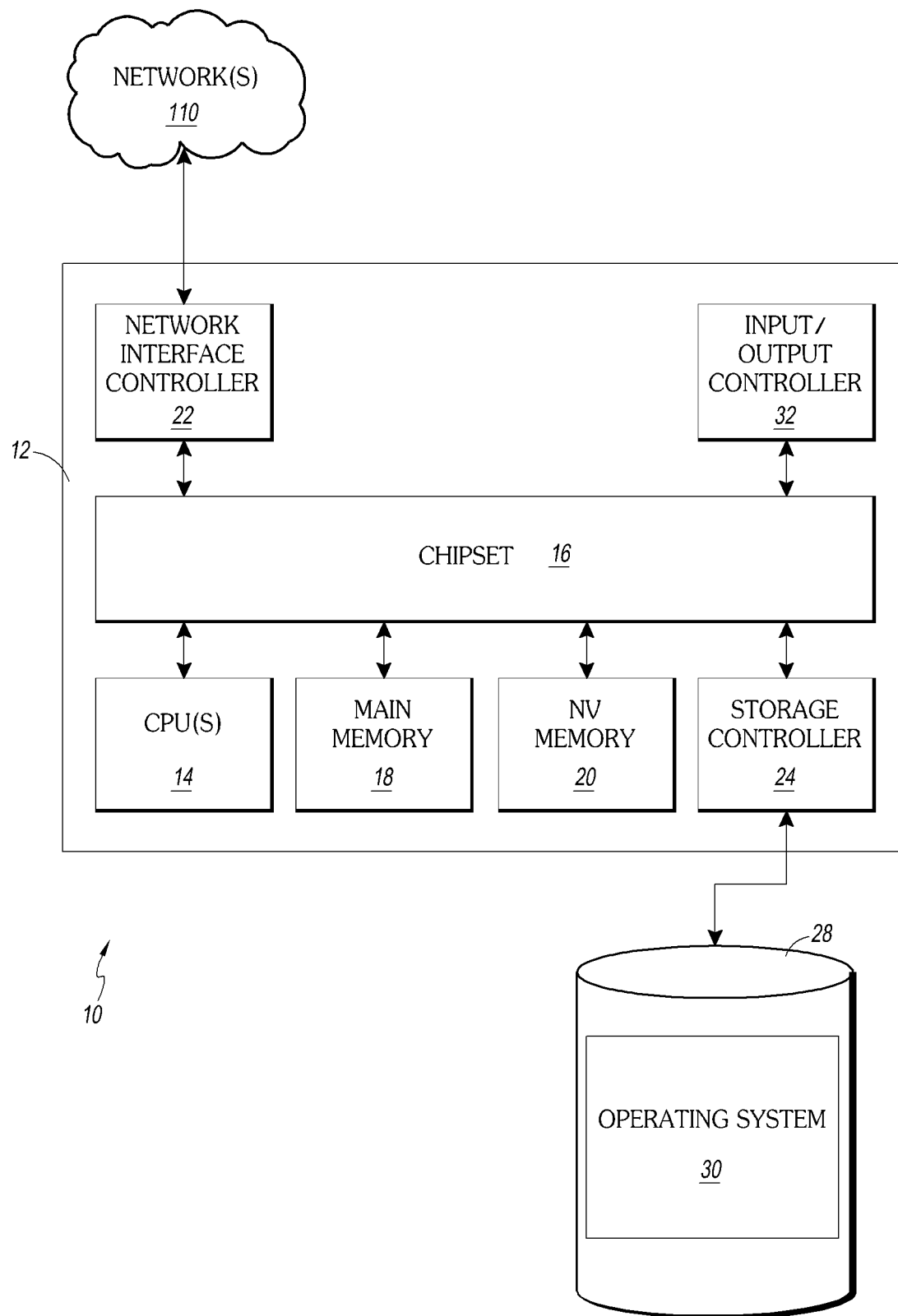
FIG. 6 is a computer architecture diagram showing illustrative computer hardware architecture for computing devices described in embodiments presented herein.

FIG. 6 is a diagram showing an example of computer architecture 10 for a computer 12 capable of executing the software components described herein implementing an integrated handheld customer interface system, in the manner presented above. The computer architecture 10 shown in FIG. 6 may be implemented in a conventional server computer 12, workstation, desktop computer, laptop, PDA, electronic book reader, digital wireless phone, network appliance, set-top box or other computing device, and may be utilized to execute any aspects of the software components presented herein described as executing on the integrated handheld customer interface system.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through one or more networks 110, such as a local-area network ("LAN"), a wide-area network ("WAN"), the Internet or any other networking topology known in the art that connects the computer 12 to remote computers. The chipset 16 may include functionality for providing network connectivity through a network interface controller ("NIC") 22, such as a gigabit Ethernet adapter. For example, the NIC 22 may be capable of connecting the computer 12 to other computing devices over the network(s) 110. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The mass storage device 28 may store an operating system 30 utilized to control the operation of the computer 12. According to one embodiment, the operating system 30 comprises the LINUX operating system. According to another embodiment, the operating system comprises the WINDOWS® SERVER operating system from MICROSOFT Corporation of Redmond, Washington. According to further embodiments, the operating system may comprise the UNIX or SOLARIS operating systems. It should be appreciated that other operating systems may also be utilized.

The mass storage device 28 may store other system or application programs and data utilized by the computer 12. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above.

The computer 12 may also include an input/output controller 32 for receiving and processing input from a number of input devices, such as a keyboard, a mouse, a touchpad, a touch screen, an electronic stylus or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 7, may include other components that are not explicitly shown in FIG. 7, or may utilize an architecture completely different than that shown in FIG. 7.

An overview of the integrated handheld customer interface system.

A single application that can be utilized to make a payment at any participating restaurant.

Entry and maintenance of payment instruments, as well as guest profile information.

A branded experience when the guest is inside the four walls of the restaurant.

Ability to suggest the most cost-effective payment instrument.

Provision of guest profile information and payment details to any participating restaurant.

Data capture around the in-store experience, including location, guest identity, and order details.

Basic reordering of items already on the receipt (optional).

Entry of food allergies, nutritional goals, and other information which may be used to enhance and personalize a guest's ordering and dining experience.

Links to guest's social media identities to facilitate filling out profile information, account creation, and sharing of good experiences.

Push notification welcoming guest to a restaurant.

Reservations and wait line management.

Full menu ordering.

Integration to online ordering.

Direct loyalty integrations.

Geofencing for takeout/curbside orders.

Restaurant Opportunities

Increase avg. check size because of ability to reorder on-demand, rather than waiting for wait staff to come by the table.

Minimize the amount of time wait staff spends on payment so that their time can be reallocated to other activities.

Guest profile data, including location and dietary information.

Proactively inform restaurants of guest's profile, food preferences, and health/nutritional/allergen requirements.

Enrollment

1. A call-to-action directs the guest to download the app.
2. Having installed the app, the guest claims her check, by entering their table number or a short, unique check ID provided by her waiter.
3. The guest reviews her check and adds a tip.
4. The guest enters her credit/debit card details and makes a payment.
5. The payment is settled at the POS and the check is closed.
6. The guest receives her receipt and is free to leave the restaurant.

Repeat Use

The repeat use scenario is similar to the enrollment scenario, but even more valuable because it takes less time. The app is already installed and the guest's payment details are stored, shaving off a substantial amount of time. The guest needs only to launch the app, claim the check, and confirm payment.

Integrations

Facebook and Google for single sign-on.

Foursquare for establishing guest presence at a participating restaurant.

OpenTable™ for reservations, guest presence, and guest profile.

Loyalty providers for incremental value to the guest.

Gift card providers for low-cost payment processing.

Opportunities

At-table ordering and reordering.

Automatic location detection.

Reservations.

Remote checking and waitlist management.

Sharing guest profile (e.g., name, allergies or nutritional preferences, food or drink preferences) upon or prior to arrival.

Experience survey at the end of the meal.

Although the word "restaurant" has been used to describe the various embodiments, the system and methods described herein may also be applicable to other businesses and hospitality industry environments, such as bookstores, cafes, retail shops, classrooms, offices, private parties, public events, sporting events, etc., where interactions between an establishment and its patrons can help enhance the experience of the patrons at the establishment.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A cloud-accessible data center operable with a point of sale (POS) system associated with a plurality of restaurants, the cloud-accessible data center comprising:
   a network interface controller configured to communicate with a wireless mobile computing device via a network and the POS via a separately addressable interface configured to communicate with the POS; and
   a hardware processor configured to:
      receive, via the network interface controller, a request from the wireless mobile computing device for a specific customer to check in,
      in response to the request, automatically identify one of the plurality of restaurants with which to create an open ticket for adding food items,
      provide instructions to the POS via the interface to automatically create the open ticket in the POS system for the identified restaurant,
      query a remote database for information associated with the specific customer,
      send, via the interface, the specific customer information to the POS system to be added to the open ticket so that the open ticket is uniquely associated with the specific customer, and
      cause at least a portion of the specific customer information to be displayed at the identified one of the plurality of restaurants before the wireless mobile computing device arrives at the identified one of the plurality of restaurants.

2. The cloud-accessible data center of claim 1, wherein the hardware processor is further configured to automatically detect a current location of the specific customer.

3. The cloud-accessible data center of claim 1, wherein the information associated with the specific customer comprises at least one of the customer's name, the customer's profile maintained by a merchant or a group of related merchants, picture, loyalty program ID, past dining history, food preferences, allergies, and a favorite entree.

4. The cloud-accessible data center of claim 1, wherein the hardware processor is further configured to:
   generate a notification indicative of the request for the specific customer to check in; and
   send, via the network interface controller, the notification to a computing device associated with the identified restaurant other than the POS system.

5. The cloud-accessible data center of claim 1, wherein the hardware processor is further configured to:
   receive, via the network interface controller, food order details from the specific customer, and
   transmit, via the network interface controller, data related to a bill to the specific customer.

6. The cloud-accessible data center of claim 1, wherein the wireless mobile computing device has a hardware processor and a computer memory, the computer memory configured to store a mobile application configured to automatically manage check-in requests.

7. The cloud-accessible data center of claim 1, wherein the hardware processor is further configured to:
   receive, via the network interface controller, a first notification that the open ticket has been paid, and
   send, via the network interface controller, the first notification to the wireless mobile computing device.

8. The cloud-accessible data center of claim 1, wherein the hardware processor is further configured to:
   receive, via the network interface controller, a GPS signal from the wireless mobile computing device, and
   determine that the GPS signal is indicative of the wireless mobile computing device being located within a geo-fencing including the identified restaurant,
   wherein the automatically identifying of the one of the plurality of restaurants is based on the determination that the GPS signal is indicative of the wireless mobile computing device being located within the geo-fencing including the identified restaurant.

9. The cloud-accessible data center of claim 1, wherein the hardware processor is further configured to:
   receive, via the integrated customer interface controller, identification information for the specific customer from a computing device associated with the identified restaurant, and
   in response to receiving the identification information, provide the computing device access to the specific customer information.

10. A method of using a cloud-accessible data center operable with a point of sale (POS) system associated with a plurality of restaurants, the method comprising:
   receiving, at a cloud-accessible data center, a request from a wireless mobile computing device for a specific customer to check in;
   automatically identifying, with the cloud-accessible data center, one of the plurality of restaurants with which to create an open ticket for adding food items in response to the request;
   providing instructions to the POS, via a separately addressable interface configured to communicate with the POS, to automatically create the open ticket in the POS system for the identified restaurant;
   querying a remote database for information associated with the specific customer;
   sending, via the cloud-accessible data center, the specific customer information to the POS system to be added to the open ticket so that the open ticket is uniquely associated with the specific customer; and
   causing at least a portion of the specific customer information to be displayed at the identified one of the plurality of restaurants before the wireless mobile computing device arrives at the identified one of the plurality of restaurants.

11. The method of claim 10, further comprising automatically detecting a current location of the specific customer.

12. The method of claim 10, wherein the information associated with the specific customer comprises at least one of the customer's name, the customer's profile maintained by a merchant or a group of related merchants, picture, loyalty program ID, past dining history, food preferences, allergies, and a favorite entree.

13. The method of claim 10, further comprising:
generating a notification indicative of the request for the specific customer to check in; and
sending the notification to a computing device associated with the identified restaurant other than the POS system.

14. The method of claim 10, further comprising:
receiving food order details from the specific customer; and
transmitting data related to a bill to the specific customer.

15. The method of claim 10, wherein the wireless mobile computing device has a hardware processor and a computer memory, the computer memory configured to store a mobile application configured to automatically manage check-in requests.

16. The method of claim 10, further comprising:
receiving a first notification that the open ticket has been paid; and
sending the first notification to the wireless mobile computing device.

17. The method of claim 10, further comprising:
receiving a GPS signal from the wireless mobile computing device; and
determining that the GPS signal is indicative of the wireless mobile computing device being located within a geo-fencing including the identified restaurant,
wherein the automatically identifying of the one of the plurality of restaurants is further based on the determination that the GPS signal is indicative of the wireless mobile computing device is located within the geo-fencing including the identified restaurant.

18. The method of claim 10, further comprising:
receiving identification information for the specific customer from a computing device associated with the identified restaurant; and
in response to receiving the identification information, providing access to the specific customer information to the computing device.

19. A non-transitory computer readable medium having stored thereon instructions which, when executed by a hardware processor, cause the hardware processor to:
receive, via a network interface controller of a cloud-accessible data center, a request from a wireless mobile computing device for a specific customer to check in;
automatically identify one of the plurality of restaurants with which to create an open ticket for adding food items in response to the request;
providing instructions to a point of sale (POS) system, via a separately addressable interface configured to communicate with the POS system, to automatically create the open ticket in the POS system for the identified restaurant;
querying a remote database for information associated with the specific customer;
sending, via the network interface controller, the specific customer information to the POS system to be added to the open ticket so that the open ticket is uniquely associated with the specific customer; and
causing at least a portion of the specific customer information to be displayed at the identified one of the plurality of restaurants before the wireless mobile computing device arrives at the identified one of the plurality of restaurants.

20. The non-transitory computer readable medium of claim 19, wherein the instructions further cause the hardware processor to automatically detect a current location of the specific customer.

* * * * *